(12) United States Patent
Gu

(10) Patent No.: US 8,908,757 B2
(45) Date of Patent: *Dec. 9, 2014

(54) MULTI-CHANNEL VIDEO COMMUNICATION METHOD AND SYSTEM

(75) Inventor: Chenchen Gu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 937 days.

This patent is subject to a terminal disclaimer.

(21) Appl. No.: 12/977,896

(22) Filed: Dec. 23, 2010

(65) Prior Publication Data

US 2011/0090949 A1    Apr. 21, 2011

Related U.S. Application Data

(63) Continuation of application No. PCT/CN2009/073931, filed on Sep. 15, 2009.

(30) Foreign Application Priority Data

Sep. 27, 2008 (CN) .......................... 2008 1 0198890

(51) Int. Cl.
| | |
|---|---|
| *H04N 7/12* | (2006.01) |
| *H04L 29/06* | (2006.01) |
| *H04N 7/15* | (2006.01) |
| *H04N 19/164* | (2014.01) |
| *H04N 19/117* | (2014.01) |
| *H04N 19/61* | (2014.01) |
| *H04N 21/24* | (2011.01) |
| *H04N 21/258* | (2011.01) |

(52) U.S. Cl.
CPC ............... *H04L 65/80* (2013.01); *H04N 7/152* (2013.01); *H04N 19/00236* (2013.01); *H04N 19/00066* (2013.01); *H04N 19/00781* (2013.01); *H04L 65/602* (2013.01); *H04L 69/14* (2013.01); *H04N 21/2402* (2013.01); *H04N 21/25825* (2013.01); *H04N 21/25833* (2013.01)
USPC .................................................. 375/240.01

(58) Field of Classification Search
CPC . H04N 21/6175; H04N 21/2383; H04N 7/14; H04N 7/173; H04N 7/26; H04H 60/82; H04H 60/87; H04H 60/88; H04H 60/90
See application file for complete search history.

(56) References Cited

U.S. PATENT DOCUMENTS

2005/0024487 A1*    2/2005   Chen .......................... 348/14.13
(Continued)

FOREIGN PATENT DOCUMENTS

CN          1284817 A      2/2001
(Continued)

OTHER PUBLICATIONS

International Search Report for International Application No. PCT/CN2009/073931, dated Dec. 24, 2009, and English translation thereof.

(Continued)

*Primary Examiner* — Sath V Perungavoor
*Assistant Examiner* — Dakshesh Parikh
(74) *Attorney, Agent, or Firm* — Harness, Dickey & Pierce, P.L.C.

(57) ABSTRACT

A multi-channel video communication method which includes: detecting network status information and attributes of at least two remote clients, and establishing a video communication connection; selecting a video encoding parameter corresponding to each remote client according to the network status information and the attributes of each remote client; encoding raw video data according to the video encoding parameter respectively, and transmitting respectively encoded video bit-stream to each corresponding remote client. In the multi-channel video communication method, the video encoding parameter corresponding to each remote client may be selected according to the network status information and attributes of each remote client.

17 Claims, 6 Drawing Sheets

(56) References Cited

U.S. PATENT DOCUMENTS

| | | |
|---|---|---|
| 2006/0198439 A1* | 9/2006 | Zhu .................... 375/240.03 |
| 2007/0005690 A1 | 1/2007 | Corley et al. |
| 2008/0091845 A1* | 4/2008 | Mills et al. .................... 709/246 |

FOREIGN PATENT DOCUMENTS

| CN | 1605075 A | 4/2005 |
|---|---|---|
| CN | 1668109 A | 9/2005 |
| CN | 1736107 A | 2/2006 |
| CN | 101043618 A | 9/2007 |
| CN | 101365125 A | 2/2009 |

OTHER PUBLICATIONS

Excerpt from, Shannon, Claude Elwood, and Warren Weaver, The Mathematical Theory of Communication. Urbana: University of Illinois, 1949, and its English translation thereof.

Chinese Office Action for Application No. 2008101988906, dated Oct. 16, 2009.

Chinese Office Action for Application No. 200810198890.6, dated Aug. 3, 2011.

Chinese Office Action for Application No. 200810198890.6, dated Apr. 2, 2011.

* cited by examiner

MULTI-CHANNEL VIDEO COMMUNICATION METHOD AND SYSTEM

CROSS-REFERENCE TO RELATED APPLICATIONS

This application is a continuation of International Application No. PCT/CN2009/073931, filed on Sep. 15, 2009. This application claims the benefit and priority of Chinese Patent Application No. 200810198890.6, filed Sep. 27, 2008. The entire disclosures of each of the above applications are incorporated herein by reference.

FIELD

The present disclosure relates to computer network technologies, and more particularly, to a multi-channel video communication method and system in a computer network.

BACKGROUND

This section provides background information related to the present disclosure which is not necessarily prior art.

Work and life of people are changed greatly by development of the Internet technologies. Video communication technology enables persons separated by thousands of miles to obtain a face-to-face communication experience. Therefore, the video communication technology has been widely used in video chatting, video conference, network game, and so on.

Since the large amount of raw video data necessary to be processed in the video communication, it is necessary to perform video encoding on the raw video data before transmission, and then to generate a video bit-stream meeting certain requirements by setting encoding parameter, such as resolution, frame-rate and bit-rate, for a video encoder. At the receiving terminal, decoded video images may be obtained by decoding the video bit-stream. As to a fixed video codec, a video sequence is encoded with certain encoding parameters, and a relationship between the bit-rate and distortion may be obtained to serve as rate-distortion characteristic of the codec. The rate-distortion characteristic is generally used to describe decoded video quality corresponding to the bit-stream generated by the codec in conditions of different bit-rates.

In one-to-one network video communication, encoding parameters and transmission technologies are generally adjusted self-adaptively according to network status, so as to adapt to fluctuation of network bandwidth and improve transmitted video quality. In the process of multi-person video communication, since there are heterogeneity and time-varying property of status of a network connecting multiple subscribers, and processing capabilities of terminal devices (e.g., mobile phone and personal computer) are also different, the encoding parameters are set for video encoding and decoding according to average or major requirements traditionally, and a single bit-stream may be generated after encoding the raw video data. The single bit-stream may be broadcast for all the subscribers participating in a communication, and all the receiving remote clients may possess same video quality for the same video source being sent.

The multi-person video communication technology with single bit-stream broadcast can not adapt to variety of terminal processing capability and network status, for a subscriber with better network status and stronger terminal device processing capability, resources will be wasted and optimal video communication quality will not be achieved. While for a subscriber with worse network status and lower terminal processing capability, status, such as network congestion or terminal device cannot perform processes normally, will be caused.

SUMMARY

This section provides a general summary of the disclosure, and is not a comprehensive disclosure of its full scope or all of its features.

In view of above, it is necessary to solve the problem that the multi-person video communication technology with single bit-stream broadcast can not adapt to variety of terminal processing capability and network status, and to provide a method for improving multi-channel video communication quality.

In addition, a system for improving the multi-channel video communication quality is also provided.

To solve the above technical problem, the following technical schemes are provided.

A multi-channel video communication method, including:
detecting network status information and attributes of at least two remote clients, and establishing a video communication connection;
selecting a video encoding parameter corresponding to each remote client according to the network status information and the attributes of each remote client;
encoding raw video data according to the video encoding parameter respectively, and obtaining encoded video bit-stream corresponding to each remote client;
transmitting the respectively encoded video bit-stream to each corresponding remote client.

A multi-channel video communication system, including:
a network module, configured to detect network status information, attributes of at least two remote clients, and establish a video communication connection;
a video quality module, which is connected with the network module, configured to store a candidate video-encoding-parameter table, wherein a corresponding relationship between video encoding parameter and video rate-distortion characteristics is set in the candidate video-encoding-parameter table, the video quality module is further configured to provide video encoding parameters corresponding to the at least two remote clients according to the network status information and the attributes of the at least two remote clients; and
a video codec module, which is connected with the video quality module and the network module, configured to encode raw video data respectively according to the at least two video encoding parameters provided by the video quality module, and send encoded video bit-stream to each corresponding remote client respectively through the network module.

In the above multi-channel video communication method or system, video encoding parameters corresponding to each remote client are selected according to network status information and attributes of each remote client, such that encoded video bit-stream received by each remote client may adapt to network bandwidth and device attributes of each remote client, and quality of multi-channel video communication may be improved.

The video encoding parameter with the maximum video-distortion improvement when same encoding bit-rate is added, may be updated as current video encoding parameter for a corresponding video codec. Thus, limited network bandwidth may be effectively utilized and the whole quality of multi-channel video communication may be improved.

Filtering conditions about resolution, frame-rate, maximum available uplink bandwidth and maximum available downlink bandwidth are set, so as to avoid unavailable video communication caused by nonsupport by local client or partial remote clients.

The network status may be detected and updated periodically, and encoding parameters may be selected according to updated network status, thus network self-adaptive adjustment may be achieved according to fluctuation status of different networks.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In the multi-channel video communication method and system provided by embodiments of the invention, an independent video codec is adopted for each connection channel, a relationship table between video-rate distortion characteristic and video encoding parameter is established for the video codec, encoding parameter corresponding to video codec in each channel may be adjusted according to difference of network status and terminal device processing capability in each connection channel, so as to improve the whole video communication quality of multi-channel video communication.

Figure 1:
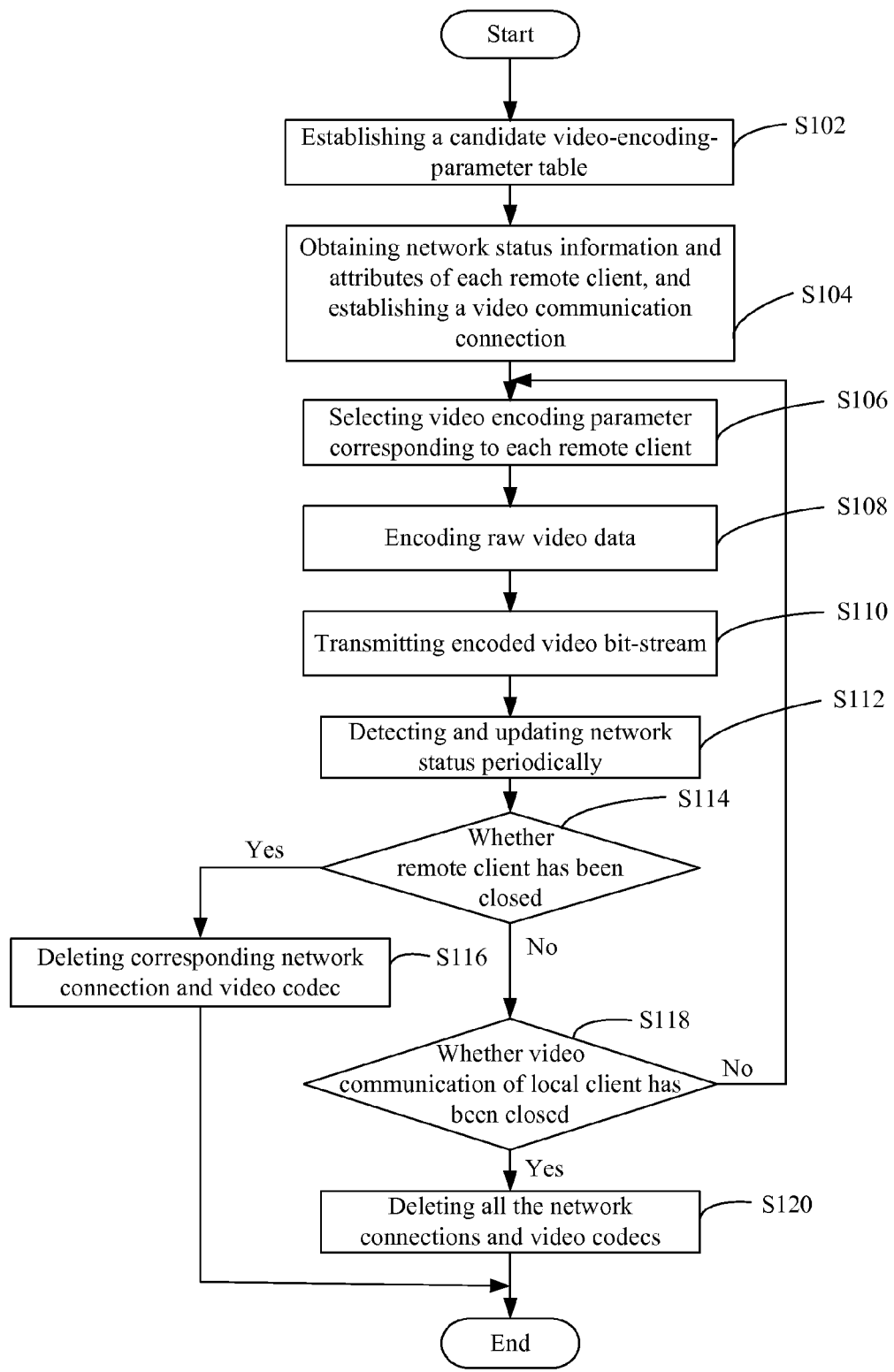
FIG. 1 is a flowchart illustrating a multi-channel video communication method.

As shown in FIG. 1, a multi-channel video communication method includes the following steps.

Step S102, a candidate video-encoding-parameter table is established. The video-encoding-parameter table refers to a relationship table between video encoding parameter and video-rate distortion characteristic. When encoding raw video data with a certain group of video encoding parameters, the obtained bit-rate and decoded video distortion will correspond to the video encoding parameter in the group. In general, the candidate video-encoding-parameter table has already been established and stored before performing the video communication.

Step S104, network status information and attributes of each remote client may be obtained, and a video communication connection may be established. Maximum available uplink bandwidth of local network, number of remote clients connected with the local client, maximum available downlink bandwidth of a connection between a remote client and the local client, etc, may be obtained by detecting the network status information. Attributes of a remote client may include maximum video resolution, maximum frame-rate, etc, which may be supported by a decoder at the remote client. Establishing the video communication connection includes the following. A network connection unit is established. The network connection unit and a remote client may negotiate to determine type of a video codec used to connect them. Also, an independent video codec may be established for each remote client.

Step S106, video encoding parameter corresponding to each remote client may be selected from the candidate video-encoding-parameter table according to the local network status information, network status information and attributes of each remote client. The video encoding parameter includes resolution, frame-rate, bit-rate, quantization step, etc. When the network status and remote client allow, the selected encoding parameter may enable the whole video communication quality of each connection to achieve the optimum. Particularly, the video encoding parameter, with which the maximum video-distortion improvement may be achieved when increasing the same bit-rate, is updated as current video encoding parameter for performing the video communication with a corresponding remote client. That is to say, the increased bit-rate may be assigned to a remote client connection corresponding to the video encoding parameter. For instance, a local client Client 0 is communicating with remote clients Client 1 and Client 2, by analyzing candidate video-encoding-parameter tables of the two video codecs, if the video-distortion improvement of remote client Client 1 is better than that of remote client Client 2 when increasing video encoding bit-rate of 10 kbps within the limited uplink bandwidth of local client, the 10 kbps will be assigned to the video communication between local client Client 0 and remote client Client 1.

Step S108, raw video data may be respectively encoded according to the video encoding parameter. Based on selecting result of the video encoding parameter, the raw video data may be respectively encoded with selected video encoding parameter, and encoded video bit-stream corresponding to each remote client may be obtained.

Step S110, the encoded video bit-stream may be transmitted to each remote client. Since encoding parameter of the raw video data has been determined according to network status and conditions of remote clients, the whole quality of decoded video communication is optimal with existing network status and conditions of remote clients.

Step S112, the network status may be detected and updated periodically. For instance, the network status information may be detected every 3 or 5 seconds, to facilitate updating network status timely.

Step S114, whether the other remote client is closed may be determined according to network detection result. If yes, proceeding to step S116, and the flow will be terminated after deleting network connection and video codec corresponding to the remote client.

If the other remote client is not closed in step S114, proceeding to step S118, to determine whether video communication function of local client has been closed. If the video communication function of local client has not been closed, returning back to step S106, to select the encoding parameter according to updated network status. If the video communication function of local client has already been closed, proceeding to step S120, to delete network connection units and video codec corresponding to all the remote video clients and then to terminate the flow.

The above method will be described in detail in the following.

It is necessary to obtain relationship between video encoding parameter and distortion, before performing the video communication. It should be understood that, when adopting the same encoding method, the distortion may be smaller when the bit-rate is higher, and correspondingly, occupied network bandwidth may also be bigger. Thus, the key of the relationship between encoding parameter and distortion is another relationship between bit-rate and distortion. The candidate video-encoding-parameter table is configured to store the above relationship.

Figure 2:
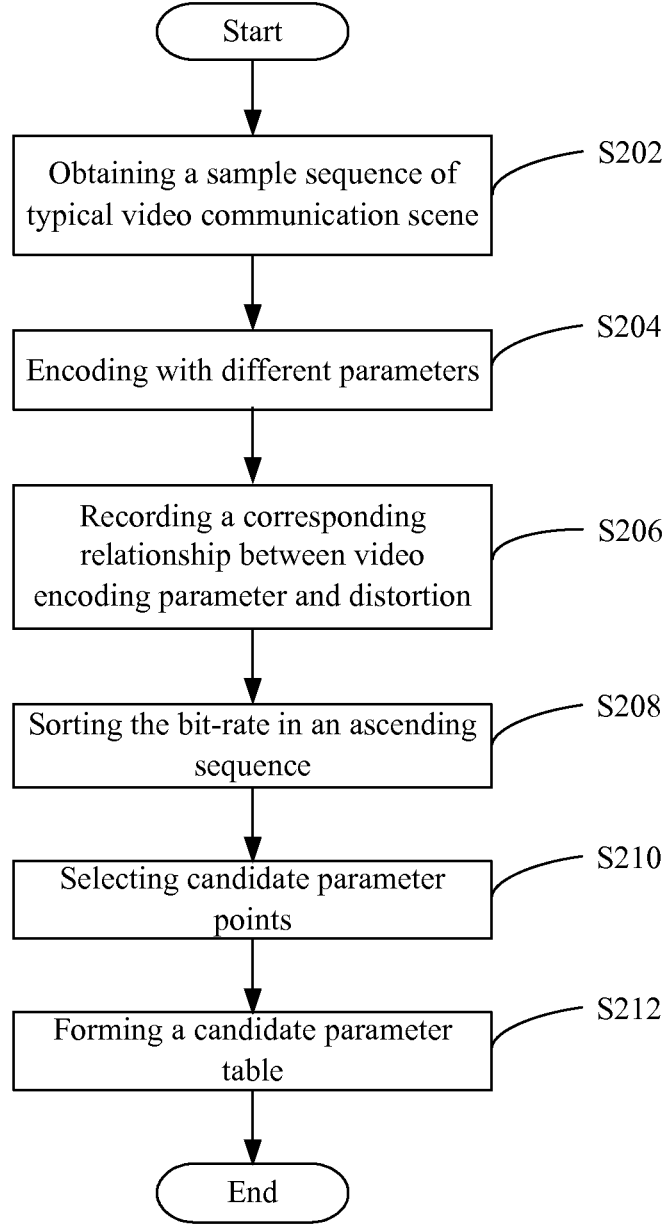
FIG. 2 is a detailed flowchart illustrating steps for establishing candidate video-encoding-parameter table.

The specific flow for establishing the candidate video-encoding-parameter table is shown in FIG. 2.

Step S202, a sample sequence of typical video communication scene which is similar to practical application may be obtained. The sample sequence of typical video communication scene may be stored in storage in advance and be read through an input and output device. The typical video communication scene, such as indoor conference, outdoor scenery and gym arena, may be captured by a camera.

Step S204, the sample sequence of typical video communication scene may be encoded with different video encoding parameters, for example, other encoding parameters, such as different resolutions, different frame-rates, different quantization steps, may be adopted to perform the encoding, and video bit-stream with different bit-rates may be obtained after the encoding.

Step S206, a corresponding relationship between video encoding parameter and rate-distortion characteristic may be recorded. Specifically speaking, an average distortion of all the sample sequences with different bit-rates may be recorded. The distortion refers to distortion compared with raw video, after decoding video bit-stream with different bit-rates when finishing the encoding, and respectively sampling the decoded video in space-domain and time-domain to the same resolution and frame-bit as the raw video.

Figure 3:
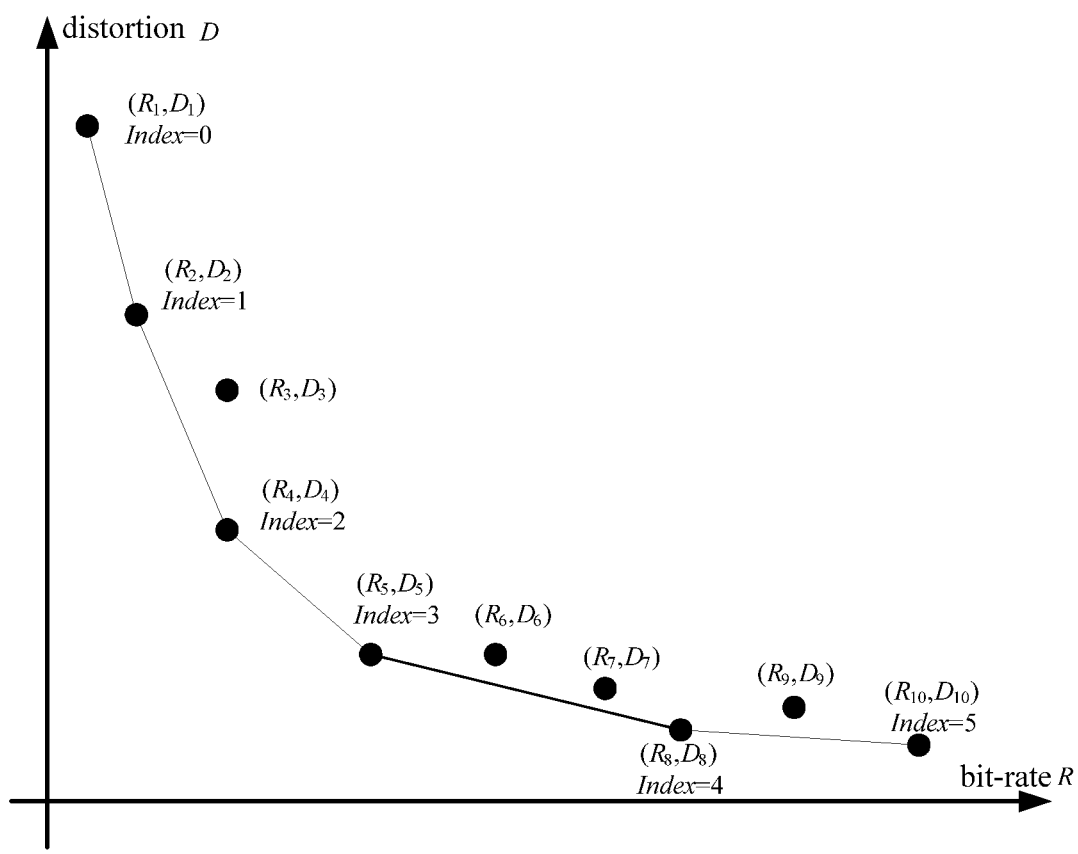
FIG. 3 is a curve schematic diagram illustrating a relationship between bit-rate and distortion.

Step S208, a relationship between bit-rate (R) and distortion (D) (as shown in FIG. 3) may be obtained when sorting the bit-rate in an ascending sequence. There are multiple sampling points about bit-rate and distortion, in which each point demonstrates distortion generated by encoding parameter corresponding to the bit-rate. An approximate characteristic curve about bit-rate and distortion of video codec may be constructed by sample points (bit-rate R, distortion D).

Step S210, candidate parameter points may be selected from above sample points. The slope of each point on the rate-distortion characteristic curve may be referred to as rate-distortion slope. Bigger rate-distortion slope demonstrates that video distortion reduces faster when increasing the same encoding bit-rate, that is, demonstrates bigger video distortion improvement. Points constructing a convex hull may be selected from these sampling points in an ascending sequence of bit-rate, and be taken as candidate parameter points for improving whole video communication quality in the multi-channel video communication method. Then, the rate-distortion slopes of these points meet a relationship of descending sequence. The candidate parameter points may be numbered with index value (Index=0, 1, 2, . . . ). As shown in FIG. 3, points constructing the convex hull among sampling points $(R_1,D_1), (R_2,D_2), \ldots, (R_{10},D_{10})$ are $(R_1,D_1), (R_2,D_2), (R_4,D_4), (R_5,D_5), (R_8,D_8), (R_{10},D_{10})$, that is, these convex-hull points may be taken as candidate parameter points, while the other non-convex-hull points, e.g., $(R_3,D_3)$, may be discarded.

Step S212, a group of encoding parameters (index value Index, rate-distortion-slope k, resolution s, frame-rate f, bit-rate R, quantization step QP, and other encoding parameters $par_1, par_2, \ldots$ ) corresponding to each candidate parameter point may be added to the candidate parameter table of video codec, thus, establishment of the candidate parameter table for the video codec may be completed.

Since the rate-distortion characteristic curve is fixed for the same type of video codec, it is only necessary to establish a static candidate parameter table for each kind of video codec of remote client. In the video communication process, the candidate parameter table of necessary video codec will be read, so as to avoid increasing computation complexity.

After establishing the candidate parameter table, appropriate parameter may be selected, according to network status and attributes of remote clients, for performing video encoding and communication.

Figure 4:
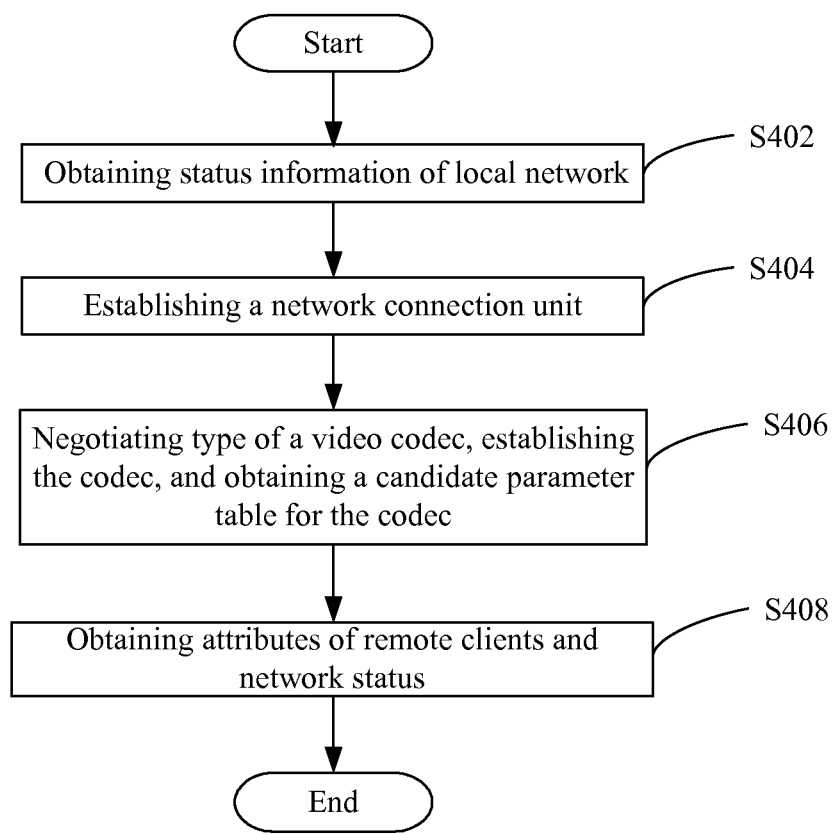
FIG. 4 is a detailed flowchart illustrating steps for obtaining network status information and attributes of each remote client as well as establishing a video communication connection.

The specific flow for obtaining network status information and attributes of remote clients as well as establishing video communication connection is illustrated from step S402 to step S408 in FIG. 4.

Step S402, local network status information may be obtained. Information, such as maximal available uplink bandwidth $B_{up0}$ of local client, and number of remote clients connected with the local client, may be obtained by detecting network status information.

Step S404, a network connection unit may be established. An independent network connection unit may be established for each remote client by the local client.

Step S406, a negotiation may be performed between the network connection unit and remote client to determine type of video codec used when connecting them, and an independent video codec may be established. Candidate parameter table corresponding to the video codec may be loaded to the video codec. Since the diversity of video codec technologies, it is necessary to negotiate by the two connected parties to determine type of video codec before performing formal video communication, so as to avoid the following scene. Video bit-stream encoded by one party cannot be decoded by the other party. Since parameters involved in different video encoding methods are different, different video codecs correspond to different candidate parameter tables.

Step S408, attributes of remote clients and network status may be obtained. Network status of remote client Clienti includes the maximal available downlink bandwidth $B_{0i}$, of the remote client when connecting with local client Client0, and so on. The attributes of the remote client include maximal video resolution $s_i$, maximal frame-rate $f_i$, etc, which may be supported by the remote client.

Figure 5:
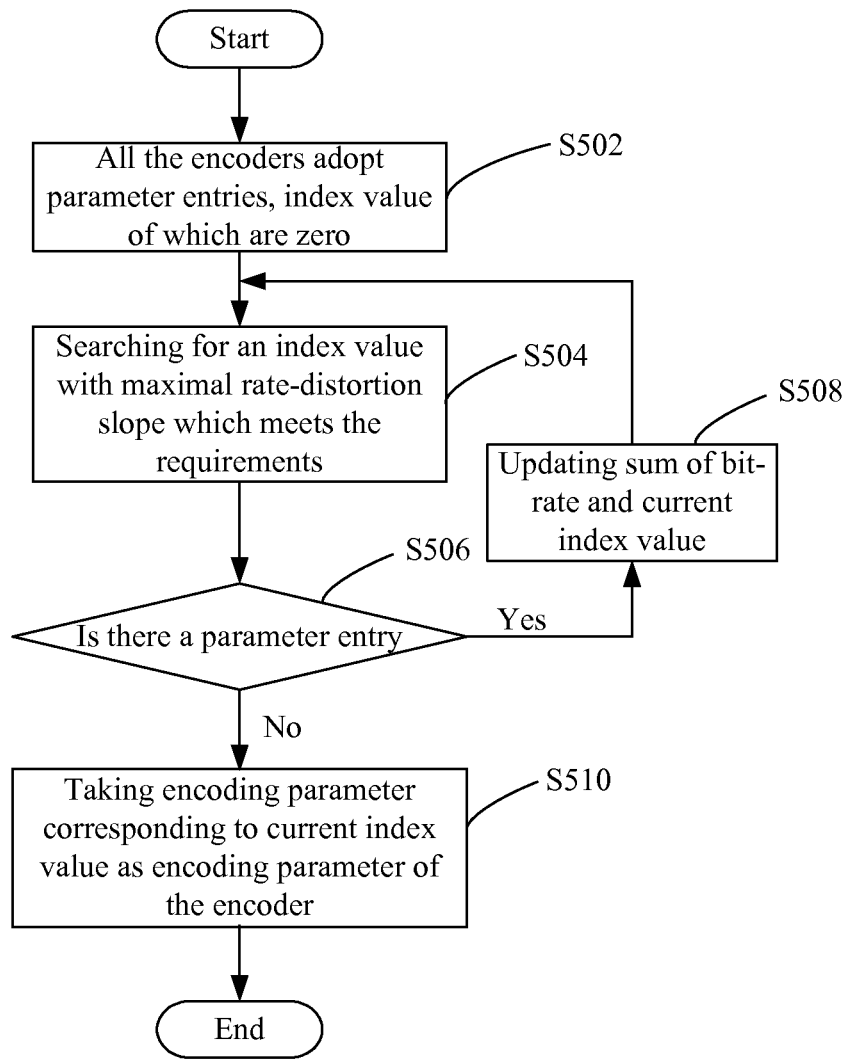
FIG. 5 is a detailed flowchart illustrating steps for selecting video encoding parameters corresponding to each remote client.

After obtaining the network status information and attributes of each remote client as well as establishing the video communication connection, video encoding parameter corresponding to each remote client may be selected according to the above information. The specific flow is illustrated from S502 to S508 in FIG. 5.

Step S502, parameter items with index value of 0 are adopted by all the encoders, that is, current index value $Index_i$ of all the video codecs from 1 to i is zero. Summation about bit-rate of all the video codecs are as follows.

$$R_{sum} = \sum_{i=1}^{N} R(index_i)$$

In the above formula, $R_{sum}$ is the sum of bit-rate corresponding to currently selected index value in the candidate parameter table corresponding to each video codec in the local client, that is, bit-rate of total uplink video bit-stream. $R(index_i)$ is a bit-rate corresponding to currently selected index value in the candidate parameter table corresponding to each video codec.

Step S504, index value $Index_n'$ with maximum rate-distortion slope which meets requirements may be searched for, according to the video codec established in step S406, attributes of remote clients and network status obtained in step S408. The formula used to search for the maximum rate-distortion slope $k(Index_n')$ is as follows.

$$k(Index_n') = \max_{1 \leq i \leq N} \{k(Index_i') \mid Index_i' > Index_i, s(Index_i') \leq s_i, f(Index_i') \leq f_i,$$
$$R(Index_i') \leq B_{0i}, R_{sum} - R(Index_i) + R(Index_i') \leq R_{up0}\}$$

In the above formula, $Index_n'$ demonstrates an index value corresponding to the maximum rate-distortion slope newly searched out.

$$\max_{1 \leq i \leq N}$$

demonstrates to search for new and maximum rate-distortion slope value $k(Index_i')$ in all the candidate parameter tables. Conditions necessary to be satisfied by the new and maximum rate-distortion slope value $k(Index_i')$ are as follows.

$Index_i' > Index_i$, that is, as to one video codec, new index value needs to be larger than current index value. In other words, the index value corresponding to maximum rate-distortion slope may be searched for toward bit-rate augmentation.

$s(Index_i') \leq s_i$, that is, the resolution corresponding to the new index value is not larger than the maximum resolution supported by corresponding remote client.

$f(Index_i') \leq f$, that is, the frame-rate corresponding to the new index value is not larger than the maximum frame-rate supported by corresponding remote client.

$R(Index_i') \leq B_{0i}$ that is, the bit-rate corresponding to the new index value is not larger than the maximum downlink bandwidth when corresponding remote client is connecting with the local client.

$R_{sum} - R(Index_i) + R(Index_i') \leq R_{up0}$, that is, subtracting bit-rate corresponding to index value of current maximum rate-distortion slope from sum of encoding bit-rates of all the current video codecs to obtain an intermediate value, and adding bit-rate corresponding to index value of maximum rate-distortion slope newly searched out to the intermediate value to obtain a final value, the final value should be not larger than the maximum available uplink bandwidth of the local client.

In step S504, there may be a scene in which at least two maximum rate-distortion slopes are existed, that is, there may be at least two video encoding parameters with which maximum video-distortion improvement may be identically achieved when adding same encoding bit-rate. Under the circumstances, one of the maximum rate-distortion slopes may be selected randomly.

Step S506, whether new index value meeting the conditions has been searched out in S504 may be determined. If yes, proceeding to step S508. Otherwise, proceeding to step S510.

Step S508, $R_{sum} = R_{sum} - R(Index_n) + R(Index_n')$ which demonstrates sum of encoding bit-rates of all the current video codecs may be updated, that is, bit-rate corresponding to current index value may be replaced with another bit-rate corresponding to the new index value. The new index value may be taken as current index value ($Index_n = Index_n'$). Then, S504 may be executed once again to search for new index value. Larger rate-distortion slope demonstrates larger video-distortion improvement when adding same bit-rate. Therefore, after searching out the index value $Index_n'$ corresponding to maximum rate-distortion slope, the index value $Index_n'$ corresponding to the maximum rate-distortion slope may be taken as current index value $Index_n$ of video codec n. Bit-rate of corresponding video codec may be increased by increasing index value. While, when searching out an index value corresponding to maximum rate-distortion slope, video-distortion may be reduced largely when adding same bit-rate. Thus, network bandwidth may be fully utilized and whole video-distortion may be reduced to the utmost.

Step S510, encoding parameter corresponding to current index value may be taken as encoding parameter of the encoder.

In above multi-channel video communication method, video encoding parameter corresponding to each remote client may be selected according to network status information and attributes of each remote client, to enable encoded video bit-stream received by each remote client to be adaptive to network bandwidth and device attributes of each remote client, thus quality of the multi-channel video communication may be improved. Video encoding parameter with which maximum video-distortion improvement may be achieved when adding same encoding bit-rate, may be updated as current video encoding parameter of corresponding video codec. Thus, limited network bandwidth may be fully utilized, and whole quality of the multi-channel video communication may be improved. Filtering conditions, such as resolution, frame-rate, maximum available uplink bandwidth, maximum available downlink bandwidth, may be set, to avoid the following scenes. Local client or partial remote clients cannot support corresponding resolution or frame-rate. Or, video communication becomes unavailable when there is not enough bandwidth. Computation may become simple when adopting a method about sampling points. Of course, in other implementation modes, a relationship with higher accuracy between distortion and bit-rate may be obtained by performing curve fitting on sampling points. Correspondingly, computation may become complicated.

Figure 6:
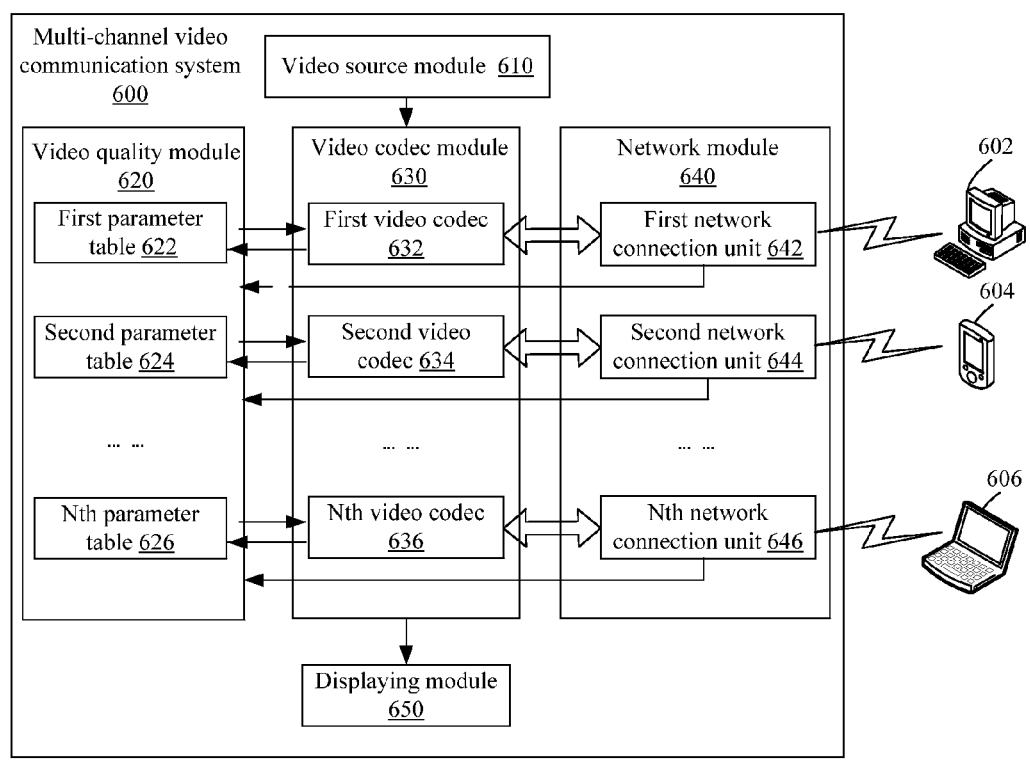
FIG. 6 is a diagram illustrating functional modules of a multi-channel video communication system. Corresponding reference numerals indicate corresponding parts throughout the several views of the drawings.

As shown in FIG. 6, FIG. 6 is a schematic diagram illustrating video communication between a multi-channel video communication system 600 (e.g., local client) and at least two remote clients (e.g., desktop 602, mobile phone 604, laptop 606). Multi-channel video communication system 600 includes a video source module 610, a video quality module 620, a video codec module 630, a network module 640 and a displaying module 650.

Video source module 610 is configured to store or capture a sample sequence of typical video communication scene, raw video data necessary to be encoded and transmitted through the video communication, and so on.

Video codec module 630, which connects with video source module 610, is configured to receive the raw video data from video source module 610, encode the raw video data, and generate encoded video bit-stream. Video codec module 630 is also connected with network module 640, so as to obtain encoded video bit-stream transmitted by other remote clients and received by network module 640, decode the encoded video bit-stream and generate a corresponding decoded video. The decoded video is transmitted to displaying module 650 which is connected with video codec module 630 for displaying.

Network module 640 is configured to detect network status information and attributes of at least two remote clients, and establish a video communication. By detecting network status information, network module 640 may obtain maximum available uplink bandwidth $B_{up0}$ of local client, number of remote clients needed to perform video communication with the local client, etc. Network module 640 establishes an independent network unit for each remote client. First network connection unit 642 connects with remote client desktop 602. Second network connection unit 644 connects with remote client mobile phone 604, and so on. Nth network connection unit 646 connects with remote client laptop 606. By using the above network connection units, network module 640 respectively communicates with each remote client, to obtain attributes of each remote client and network status. Network status of a remote client includes maximum available downlink bandwidth $B_{0i}$, of the remote client, when the remote client is connecting with local client, and so on. Attributes of a remote client include maximum resolution $s_i$, maximal frame-rate $f_i$, supported by the remote client, and so on.

Network module 640 is further configured to negotiate with a remote client to determine type of a video codec used to connecting them. Video codec module 630 establishes an independent video codec for each remote client according to the type of video codec determined by negotiation. Each video codec corresponds to one remote client. First video codec 632 connects with remote client desktop 602 through first network connection unit 642. Second video codec 634 connects with remote client mobile phone 604 through second network connection unit 644, and so on. Nth video codec 636 connects with remote client laptop 606 through third network connection unit 646.

Video quality module 620 which connects with video codec module 630 and network module 640, is configured to store candidate video-encoding-parameter tables of all video codecs. Candidate video-encoding-parameter table includes a corresponding relationship between video encoding parameter and video-rate distortion characteristic. Video quality module 620 provides video encoding parameters corresponding to at least two remote clients, according to the network status and attributes of the at least two remote clients which are detected by network module 640. Video quality module 620 searches for a video encoding parameter, with which maximum video distortion improvement may be achieved when adding same encoding bit-rate to each video codec, in the candidate video-encoding-parameter table, and takes the video encoding parameter searched out as current video encoding parameter of corresponding video codec. If there are at least two video encoding parameters, with which maximum video distortion improvement may be achieved identically when adding same encoding bit-rate, video quality module 620 randomly updates one video encoding parameter of them as current video encoding parameter of corresponding video codec. Video codec module 630 encodes raw video data according to the video encoding parameter provided by video quality module 620, and sends encoded video bit-stream to corresponding remote client through network module 640.

For example, as shown in FIG. 6, there are candidate video-encoding-parameter tables established in video quality module 620, the number of which is the same as that of video codecs. First parameter table 622 is connected with first video codec 632 correspondingly. Second parameter table 624 is connected with second video codec 634 correspondingly, and so on. Nth parameter table 626 is connected with third video codec 636 correspondingly. First parameter table 622 is configured to store a candidate parameter table corresponding to video codec 632. Video quality module 620 provides corresponding video encoding parameters, according to maximum available downlink bandwidth $B_{O1}$ of remote client desktop 602 when local client is connecting with remote client desktop 602, maximum video resolution $s_1$ and maximum frame-rate $f_1$ both supported by remote client desktop 602, which are detected by network module 640, utilizes network bandwidth and performance of remote clients as fully as possible, so as to improve video quality.

More specifically, taking first video codec 632 and second video codec 634 as an example, supposing index values corresponding to current video encoding parameters of them are both zero, when rate-distortion slope of a sampling point corresponding to next index value (e.g., both 1) of first video codec 632 is larger than that of second video codec 634, encoding parameter of an entry, index value of which is 1 in first video codec 632, will be taken as current encoding parameter of first video codec 632. In the next round of searching, rate-distortion slope corresponding to next index value (e.g., 2) of current index value (e.g., 1) of first video codec 632 will be compared with another rate-distortion slope corresponding to next index value (e.g., 1) of current index value (e.g., 0) of second video codec 634, to determine which one is larger.

It is easy to understand that, since video communication is mutual, a remote client (e.g., desktop 602, mobile phone 604, laptop 606) also possesses an architecture similar to the architecture of multi-channel video communication system 600.

The foregoing embodiments only demonstrate several implementation modes of the invention, although descriptions thereof are very specific and detailed, it should not be understood as limitation to scope of the invention. It should be pointed out that, several transformations and improvements may be made by persons having ordinary skill in the art without depart from design of the invention, which are also covered by protection scope of the invention. Therefore, protection scope of the invention should be based on appended claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-channel video communication method, comprising:
   detecting network status information and attributes of at least two remote clients, and establishing a video communication connection;
   selecting a video encoding parameter corresponding to each remote client according to the network status information and the attributes of each remote client;
   encoding raw video data according to the video encoding parameter respectively, and obtaining an encoded video bit-stream corresponding to each remote client;
   transmitting the respectively encoded video bit-stream to each corresponding remote client;
   wherein selecting the video encoding parameter corresponding to each remote client according to the network status information and the attributes of each remote client comprises:
   selecting a video encoding parameter from video encoding parameters corresponding to respective remote clients in accordance with the video encoding parameter providing a maximum video distortion improvement when applying the same encoding bit rate to each video codec corresponding to each respective remote client; and
   defining a current video encoding parameter for a remote client corresponding to the selected video encoding parameter to the selected video encoding parameter.

2. The multi-channel video communication method according to claim 1, further comprising:
   establishing a candidate video-encoding-parameter table, wherein a corresponding relationship between the video encoding parameters and video rate-distortion characteristics corresponding to the respective remote clients is established in the candidate video-encoding-parameter table.

3. The multi-channel video communication method according to claim 1, wherein detecting the network status information and the attributes of the at least two remote clients and establishing the video communication connection comprises:
   obtaining the number of remote clients connected with a local client by detecting the network status information;
   negotiating with each remote client to determine a type of a video codec for each remote client;
   establishing an independent video codec for each remote client; and
   loading a candidate video-encoding-parameter table corresponding to the established video codec.

4. The multi-channel video communication method according to claim 1, wherein selecting the video encoding parameter from the video encoding parameters corresponding to the respective remote clients in accordance with the video encoding parameter providing the maximum video distortion improvement when applying the same encoding bit rate to each video codec corresponding to each respective remote client is performed in a candidate video-encoding-parameter table.

5. The multi-channel video communication method according to claim 4, further comprising:
   when there are at least two video encoding parameters providing, maximum video distortion improvement identically when applying the same encoding bit-rate to each video codec corresponding to each respective remote client, taking one from the at least two video encoding parameters randomly as the current video encoding parameter.

6. The multi-channel video communication method according to claim 4, further comprising:
   obtaining maximum available uplink bandwidth of the local client by detecting the network status information;
   calculating sum of bit-rates corresponding to respective current video encoding parameters adopted by video codecs in the local client; and
   determining whether the sum of the bit-rates is larger than the maximum available uplink bandwidth, if not, executing the steps of selecting the video encoding parameter from the video encoding parameters and defining the current video encoding parameter repeatedly.

7. The multi-channel video communication method according to claim 4, further comprising:
   obtaining maximum available downlink bandwidth of the remote client by detecting the network status information, when the remote client is connecting with the local client;
   determining whether a video bit-rate corresponding to the currently defined video encoding parameter is larger than the maximum available downlink bandwidth of the corresponding remote client, if not, executing the steps of selecting the video encoding parameter from the video encoding parameters and defining the current video encoding parameter repeatedly.

8. The multi-channel video communication method according to claim 4, further comprising:
   obtaining maximum video resolution and a maximum video frame-rate supported by the remote client by detecting attributes of the remote client;
   determining whether video resolution and a video frame-rate corresponding to the currently updated video encoding parameter is larger than the maximum video resolution and the maximum video frame-rate respectively, if not, executing the steps of selecting the video encoding parameter from the video encoding parameters and defining the current video encoding parameters repeatedly.

9. The multi-channel video communication method according to claim 1, further comprising:
   detecting and updating the network status information periodically; and
   selecting the video encoding parameter according to updated network status information.

10. The multi-channel video communication method according to claim 9, further comprising:
    determining whether a remote client has been closed according to a detection result;
    if the remote client has been closed, deleting network connection and a video codec corresponding to the remote client.

11. The multi-channel video communication method according to claim 3, further comprising:
    determining whether video communication function of the local client has been closed;
    if the video communication function of the local client has been closed, deleting video codecs corresponding to all the remote clients in the local client.

12. The multi-channel video communication method according to claim 2, wherein establishing the candidate video-encoding-parameter table comprises:
    obtaining a sample sequence of typical video communication scenes;
    encoding the sample sequence of the typical video communication scenes with different video encoding parameters; and recording a corresponding relationship between the video encoding parameters and the video rate-distortion characteristics.

13. The multi-channel video communication method according to claim 4, wherein the candidate video-encoding-parameter table stores a corresponding relationship among the video encoding parameters, encoding bit-rates and rate-distortion characteristics, the corresponding relationship is numbered with index values in sequence in an ascending order of the bit-rates, slope of a sampling point on a rate-distortion characteristics curve corresponding to the index values is defined as rate-distortion slope;

selecting the video encoding parameter refers to searching for an index value corresponding to maximum rate-distortion slope, and determining the video encoding parameter corresponding to the index value as the video encoding parameter providing the maximum video distortion improvement.

14. A multi-channel video communication system, comprising:

a network module, configured to detect network status information and attributes of at least two remote clients, and establish a video communication connection;

a video quality module, which is connected with the network module, configured to store a candidate video-encoding-parameter table, wherein a corresponding relationship between video encoding parameters and video rate-distortion characteristics is set in the candidate video-encoding-parameter table, the video quality module is further configured to provide video encoding parameters corresponding to the at least two remote clients according to the network status information and the attributes of the at least two remote clients; and a video codec module, which is connected with the video quality module and the network module, configured to encode raw video data respectively according to the at least two video encoding parameters provided by the video quality module, and send encoded video bitstream to each corresponding remote client respectively through the network module;

wherein the video quality module is further configured to select a video encoding parameter from the at least two video encoding parameters corresponding to respective remote clients in accordance with the video encoding parameter providing a maximum video distortion improvement when applying the same encoding bit-rate to each video codec, corresponding to each respective remote client in the candidate video-encoding-parameter table, and defining a current video encoding parameter for a remote client corresponding to the selected video encoding parameter to the selected video encoding parameter.

15. The multi-channel video communication system according to claim 14, wherein there are video codecs set in the video codec module, the number of the video codecs is same as that of remote clients, and each video codec corresponds to one remote client; and the network module is further configured to negotiate with a remote client to determine a type of a video codec used when the network module is connecting with the remote client.

16. The multi-channel video communication system according to claim 14, wherein when there are at least two video encoding parameters providing the maximum video distortion improvement identically when applying the same encoding bit-rate to each video codec corresponding to each respective remote client, the video quality module is further configured to update one of the at least two video encoding parameters as the current video encoding parameter of corresponding video codec.

17. The multi-channel video communication system according to claim 14, where the attributes of a remote client detected by the network module comprise at least one of:

maximum available downlink bandwidth of the remote client, maximum video resolution supported by the remote client, and a maximum frame-rate supported by the remote client.

* * * * *